US008069070B2

(12) United States Patent (10) Patent No.: US 8,069,070 B2
Papili et al. (45) Date of Patent: Nov. 29, 2011

(54) CONFIGURATION EXTENSIONS FOR A TELECOMMUNICATIONS SERVICE PROVIDER

(75) Inventors: Marina Papili, Milan (IT); Chiara Cundari, Pisa (IT)

(73) Assignee: Accenture Global Services Limited, Dublin (IE)

( * ) Notice: Subject to any disclaimer, the term of this patent is extended or adjusted under 35 U.S.C. 154(b) by 1239 days.

(21) Appl. No.: 11/330,880

(22) Filed: Jan. 12, 2006

(65) Prior Publication Data

US 2007/0162317 A1 Jul. 12, 2007

(30) Foreign Application Priority Data

Oct. 14, 2005 (EP) ..................................... 05425723
Oct. 14, 2005 (IT) .............................. MI2005A1951

(51) Int. Cl.
*G06Q 10/00* (2006.01)

(52) U.S. Cl. ..................................... 705/7.11; 705/7.15

(58) Field of Classification Search ............. 705/8, 7.11, 705/7.15
See application file for complete search history.

(56) References Cited

U.S. PATENT DOCUMENTS

| 6,798,413 | B1 * | 9/2004 | Tracey et al. ................. 345/440 |
| 7,117,172 | B1 * | 10/2006 | Black .............................. 705/35 |
| 7,194,431 | B1 * | 3/2007 | Land et al. ...................... 705/30 |
| 7,236,950 | B2 * | 6/2007 | Savage et al. .................. 705/34 |
| 7,624,052 | B1 * | 11/2009 | Seaman et al. ................. 705/35 |
| 2006/0020525 | A1 * | 1/2006 | Borelli et al. ................... 705/34 |
| 2007/0041532 | A1 * | 2/2007 | Salonen et al. ............ 379/114.2 |
| 2007/0203798 | A1 * | 8/2007 | Caballero et al. .............. 705/26 |
| 2007/0232342 | A1 * | 10/2007 | Larocca ........................ 455/518 |
| 2009/0238349 | A1 * | 9/2009 | Pezzutti ..................... 379/93.02 |

OTHER PUBLICATIONS

Wang, et al. "On Lifetime-Oriented Device Provisioning in Heterogeneous Wireless Sensor Networks: Approaches and Challenges", IEEE Network • May/Jun. 2006.*

* cited by examiner

*Primary Examiner* — Romain Jeanty
*Assistant Examiner* — Mark Fleischer

(57) ABSTRACT

A customer care architecture integrates a full range of customer care and dunning billing features in a customer care system. The customer care architecture defines and implements multiple workflows which support dunning action requests while centralizing customer account control at the customer care system in an end-to-end telecommunications system framework. The customer care architecture thereby supports interaction, communication, and synchronization with existing and established dunning accounting systems.

20 Claims, 14 Drawing Sheets

CONFIGURATION EXTENSIONS FOR A TELECOMMUNICATIONS SERVICE PROVIDER

BACKGROUND OF THE INVENTION

Priority Claim

This application claims the priority benefit of EPO Application No. 05425723.3 filed Oct. 14, 2005, and Italian Application No. MI2005A001951 filed Oct. 14, 2005, both of which are incorporated herein by reference in their entirety.

TECHNICAL FIELD

This invention relates to data processing systems which support telecommunication service providers. In particular, this invention relates to integrating multiple independent processing systems under a set of workflows which implement a customer care system.

RELATED ART

Rapid advances in data processing and telecommunications technology have lead to a vast array of communication services available to the consumer. Telecommunication services available today range, as examples, from basic cellular phone service to combined voice, data, and paging services to wireless internet services. Behind each of the communications services are the processing systems which support the services. These processing systems perform billing, track account use, resolve customer questions and concerns, and perform many other support tasks. Accordingly, a telecommunication service provider faces enormous technical challenges in implementing, integrating, networking, and running all of the independent processing systems which support the service provider and its services.

Further technical challenges arise because each service support area further includes multiple support sub-areas. Customer care processing is one such area. Within customer care processing are support systems for order capture and processing, product and price catalog support, customer contact management, customer service requests and trouble reporting, data entry controls, reporting, customer account management, and other sub-areas.

In the past, implementing all of the systems and sub-systems required to fully support the telecommunications service provider was often accomplished with multiple independent processing systems. Each of the processing systems typically had limited communication and interaction with the numerous other processing systems in the end-to-end architecture, despite the similarity or relevance of the data which each system processed. Furthermore, because the processing systems often employed disparate and proprietary communications architectures, the telecommunications service provider was faced with the daunting technical problem of maintaining consistency of data such as customer status between systems, expanding the architecture to provide additional or different services, and upgrading the architecture components.

SUMMARY

This invention provides an architecture which implements flexible support for many features and responsibilities of a customer care system. The customer care architecture is web based and implements multiple processes in an end-to-end framework. The customer care architecture adds new functionality to existing customer care systems, thereby enhancing the customer care system implementation for a telecommunications service provider.

One aspect of the invention is a method which synchronizes customer account status across multiple processing systems which support a telecommunications service provider. The method includes receiving an incoming dunning action request at a customer care system. An independent external dunning system prepares and communicates the incoming dunning action request to the customer care system. The method also initiates execution of an asset suspend and/or resume and/or terminate workflow in the customer care system based on the incoming dunning action requests. As a result, the customer care system may update a customer account state in memory, carryout the dunning action requests and synchronize the customer account state between the dunning system and the customer care system.

The incoming dunning action request may specify an account action which the dunning system has determined is appropriate based on customer payment history. As examples, the dunning action request may be a customer account 'Suspension' action request, a customer account 'Termination' action request, or another type of request. The customer care system reserves the discretion to accept or deny the dunning action request, and may implement a review of any dunning action request by a customer care system authorized dunning operator.

Another aspect of the invention is a processing synchronization architecture for a telecommunications service provider. The architecture includes a communication interface in communication with an external dunning processing system, a memory, and a processor coupled to the memory. The memory includes a customer account state with a dunning status field, an asset suspend/resume workflow definition, and a batch processing script. The batch processing script processes the dunning batch file received from the external dunning processing system to update the dunning status fields. The customer care system then responsively initiates execution of workflows which handle the action requests specified in the dunning batch file, verify the completion of the actions, and communicate updated status to downstream processing systems, including the dunning system, billing system, and other systems. The processor executes the batch processing script and the workflows.

The memory may also include a dunning check workflow. In response to an update to the dunning status field in the customer account record, the customer care system initiates execution of the dunning check workflow. The dunning check workflow examines the dunning status field in the customer account record to determine if the dunning operator set a 'Lock' on the customer account. If so, the dunning check workflow continues by communicating the 'Lock' to downstream processing systems, including the dunning system. The downstream processing systems are thereby synchronized to the customer account state in the customer care system.

The workflow definitions provide a technical solution to the problem noted above. In particular, the workflow definitions automatically initiate processing steps which maintain the consistency of customer account information across multiple independent processing systems. The processing steps review pending account action requests, initiate steps to accomplish the action requests, communicate the action requests to the appropriate systems for processing, validate execution of the action requests, and synchronize downstream processing systems to the results. In the context of dunning action requests, for example, the workflows determine the desired account action, initiate suspend and/or resume and/or terminate workflows, communicate suspend and/or resume and/or terminate orders to a provisioning system, verify the action taken by the provisioning system, and communicate the result to the dunning system which originated the customer account action request.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of systems and methods consistent with the messaging systems may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of the architecture will be described, methods, systems, and articles of manufacture consistent with the architecture may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors.

Figure 1:
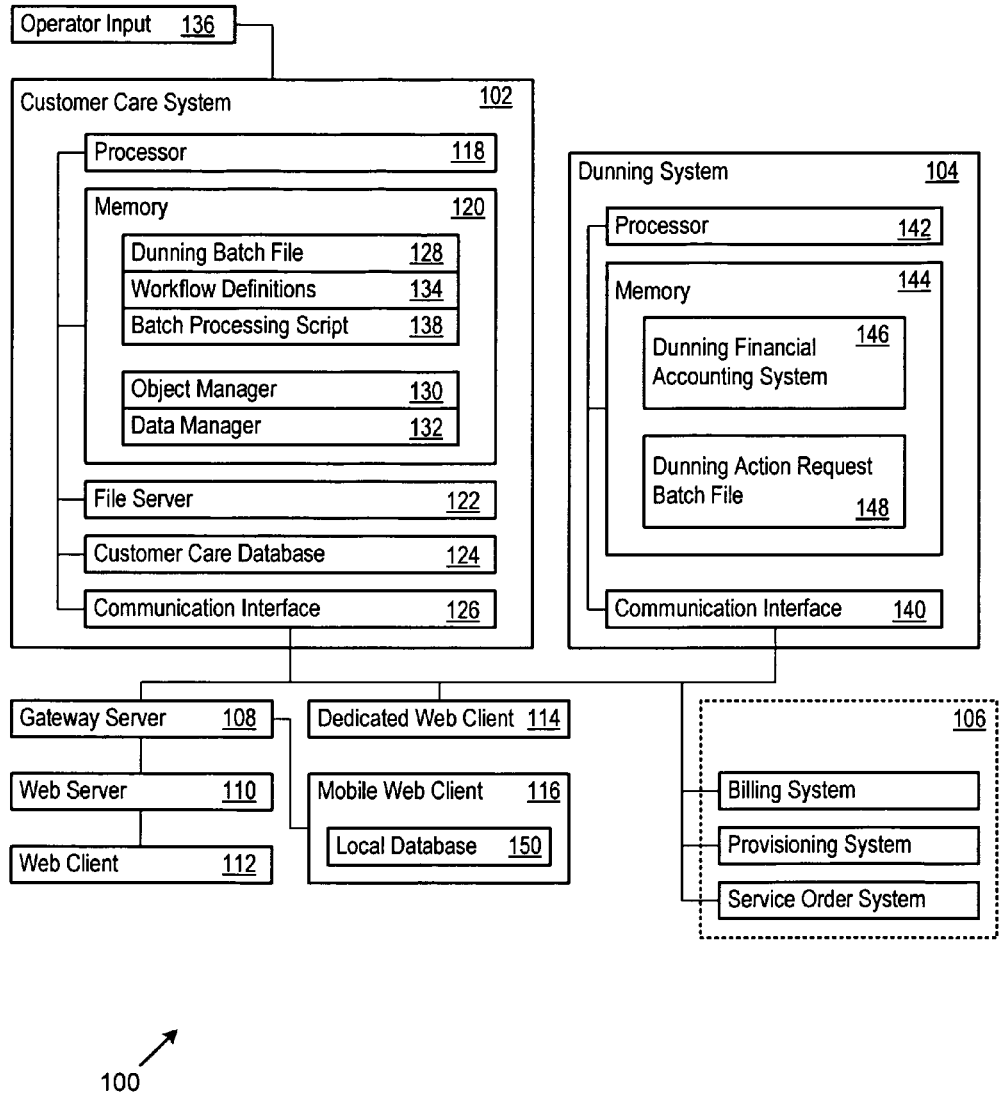
FIG. 1 shows a system architecture which integrates a customer care system, a dunning system, and support systems.

In FIG. 1, a system architecture 100 includes a customer care system 102, a dunning billing system 104, and additional telecommunications support systems 106. The support systems 106 may include a wide range of other processing systems which implement or extend the functionality of the end-to-end service provider architecture. As examples, the support system 106 may include service order systems, provisioning systems, billing systems, or other type of systems.

In addition, the architecture 100 includes a gateway server 108 and a web server 110. Local and remote clients may access the customer care system 102. Examples of clients include the web client 112, the dedicated web client 114, and the mobile web client 116.

The customer care system 102 includes a processor 118 and memory 120. The customer care system 102 may further include a file server 122, a customer care database 124, and a communication interface 126. The memory 120 stores a dunning batch file 128 received from the dunning system 104, an object manager 130, a data manager 132, and workflow definitions 134. The customer care system 102 communicates with the dunning system 104, support systems 106, and the clients 112-116 through the communication interface 126.

The workflow definitions 134 establish step by step workflows for handling events in the customer care system 102. The workflow definitions 134 implement the management of steps in a process. The workflows specify each step to be taken and the order of each step (which may execute linearly or in parallel). The workflow definitions 134 also may establish who has permission (e.g., the dunning operator) to perform each step. Task performers include people as well as automated processes. The workflow definitions 134 discussed below are Siebel™ workflow definitions defined in the Siebel™ CME workflow environment. However, other workflow definitions may be provided which are tailored for other customer care software environments.

FIG. 1 also shows an operator input 136. The operator input 136 may include a keyboard, mouse, speech recognition system, and/or any other input mechanism. The operator input 136 allows operators to interact with and direct the operation of the system 102. Alternatively or additionally, the operators may interact with and direct the operation of the system 102 locally or remotely through any of the clients 112, 114, or 116.

The system 102 responds to dunning action requests received, typically in batch files, from the dunning system 104. The system 102 thereby provides dunning management, tracks dunning status, and integrates dunning information for customer accounts into the customer care system 102. For some accounts, a dunning operator may interact locally or remotely with the customer care system 102 to access any of the dunning information stored in dunning status fields in the customer account records in the customer care database 124. For example, the dunning operator may request the system 102 to execute a customer care database search to locate one or more customer accounts which have a pending dunning action request.

The dunning operator may set a fraud level for any dunning customer, may change the credit class of the billing account associated with the dunning customer, may lock or unlock an account, and may take other actions. As explained in more detail below, the customer care system 102 receives dunning action requests from the dunning system 104. In response, the customer care system 102 initiates execution of a batch processing script 138 to update the customer account records according to the dunning action requests received from the dunning system 104. The customer care system 102 may then automatically suspend, resume, or terminate customer accounts based on the updated dunning status in each customer account record.

Upon review of pending dunning actions for a given customer account, the dunning operator may decide whether to accept, deny, or hold any requested dunning action. The dunning operator may also lock the account permanently or for a specified time duration so that dunning action requests cannot be processed against the account until the lock expires. Similarly, the dunning operator may unlock a customer account. When the dunning operator unlocks a customer account, the system 102 may initiate execution of workflows to suspend, resume, or terminate the customer account according to the requested dunning action. While the dunning operator may intercede for certain accounts (e.g., accounts with a flag set for manual review), the customer care system 102 automatically processes dunning action requests for the majority of accounts.

The dunning system 104 also includes a communication interface 140, a processor 142, and a memory 144. The memory 144 includes a dunning financial accounting system 146 and stores a dunning action request batch file 148. The processor 142 executes the dunning financial accounting system 146 to consistently review customer payment records and determine when customers are behind on their payments.

The accounting system 146 builds the batch file 148 on a regularly scheduled basis (e.g., daily or weekly). The batch file 148 includes multiple dunning action requests. Each action request specifies a customer account and specifies a desired dunning action to be taken against the account (e.g., suspend the account, resume the account, or terminate the account). The dunning system 104 communicates the batch file 148 to the customer care system 102 on a regular basis.

The customer care system 102 receives the batch file 148 and stores it in memory (e.g., on a hard disk) as the dunning batch file 128. The dunning batch processing script 138 processes the dunning batch file 128. The processing script 138 updates the customer records in the customer care database 124 to reflect the dunning action requests present in the dunning batch file 128. For example, the script 138 may execute database update operations to dunning fields in the customer care database 124. The script 138 thereby updates each customer account with, as examples, dunning status (e.g., 'Waiting for Processing'), dunning action (e.g., Suspend), and dunning date (e.g., the date the dunning action was issued).

The dunning system 104 regularly communicates with customers in an effort to obtain payment of amounts due for services delivered to the customer. The dunning system 104 may automate regular issuance of reminder letters or other messages (e.g., email, or Short Message Service (SMS) messages) to the customer. In addition, if the customer continues for significant periods of time without payment, the dunning system 104 may issue dunning action requests to the customer care system 102. The dunning action request may recommend suspension or termination of services. When a customer comes current on their invoices, the dunning action request may instead recommend re-activation of services.

In one implementation, the processor 118 in the customer care system 102 executes Siebel™ 7.7 CME and Siebel™ Server under the Windows™ operating system, the UNIX operating system, the SUN Solaris™ operating system, or any other operating system. These components may provide the object manager 130 and data manager 132, which define, store, and maintain customer data and objects in the customer care system 102. Additionally, an Oracle™ or Microsoft™ SQL server platform may implement the file server 122 and/or customer care database 124. The customer care systems implemented using these technologies are extended and improved as noted below, particularly with regard to integration and processing of dunning action requests.

The processor 142 in the dunning system 104 executes the dunning financial accounting system 146. For example, the SAP™ RM-CA Dunning Management System or the Ring Datacom™ Dunning Management System may implement the accounting system 146. The accounting system 146 may be implemented in other manners, however.

The customer care system 102 supports many different types of clients with different levels of connectivity. As one example, FIG. 1 shows a dedicated web client 114. The dedicated web client 114 may include a full installation of the object manager 130 and data manager 132. The dedicated web client 114 connects to the system 102 over a LAN, WAN, the Internet, or as a dedicated workstation. The dedicated web client 114 often serves as a development and system administration platform.

As another example, FIG. 1 shows a mobile web client 116. The mobile web client 116 may also include a full installation of the object manager 130 and data manager 132. The mobile web client 116 may function when disconnected by maintaining a local dedicated database 150. The local dedicated database 150 synchronizes with the contents of the customer care database 124. In addition, the mobile web client 116 replicates data from the customer care database 124 when the mobile web client 116 is connected to LAN or VPN (Virtual Private Network). Sales force agents may carry mobile web clients 116.

Another type of client which may connect to the customer care system 102 is the zero footprint web client 112. The web client 112 does not necessarily maintain any data locally or implement any customer care systems locally. Instead, the web client 112 interacts with the customer care system 102 over a network connection. As example, a CSR (Call Center Operator) may employ the web client 112 to view customer records, including customer billing, order, service, status, and contact information. Examples of web clients 112 include PDAs (Personal Data Assistants), mobile phones, pocket PC, and other mobile computing devices.

Figure 2:
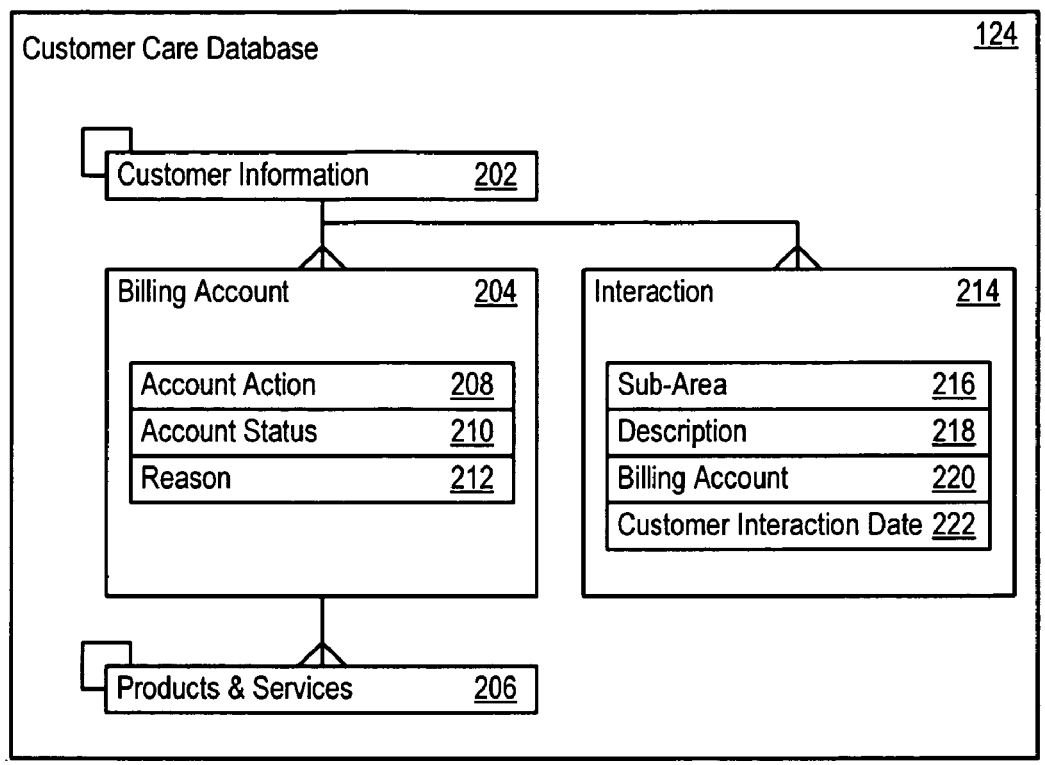
FIG. 2 shows a data structure for customer records in a customer care database in the customer care system shown in FIG. 1.

FIG. 2 summaries the structure of the customer records in the customer care database 124. The customer care database 124 includes customer information records 202. The customer information records 202 store general customer information, such as name, address, and customer identifier. Each customer information record 202 may be associated to one or more billing account records 204. In other words, a single customer may have multiple billing accounts, as examples for a home and for a business. Additionally, each billing account 204 may be associated to one or more products and services records 206. The products and services records 206 may define and establish the services to which each billing account subscribes, such as cell phone service, broadband internet access, paging, cable TV, or any other service.

The customer care database 124 establishes and maintains information related to dunning actions requested by the dunning system 104. FIG. 2 shows, for example, that the customer care database 124 includes an account dunning action field 208, an account dunning status field 210, a status change reason field 212, and an interaction section 214. The role of the fields 208-212 is discussed in more detail below with regard to integration of dunning processing in the customer care system 102.

Generally, the account dunning action field 208 may indicate whether the account should be reviewed for suspension, termination, reactivation, or reviewed for other statuses. The account dunning status field 210 may indicate the stage of processing of the account action (e.g., 'Waiting for Processing'). The status change reason field 212 provides a reason why suspension, termination, or reactivation should be considered. The interaction section 214 includes a Sub-Area field 216, a Description field 218, a Billing Account field 220 and a Customer Interaction Date field 222. The fields 216-222 store information characterizing communication which the dunning system 104 has had with the customer and which the dunning system 104 has delivered to the customer care system 102. For example, the interaction section 214 may store a dunning request letter or other dunning communication, or characteristics of the dunning communication, sent to a customer so that a customer care operator has a more complete picture of the customer account status and history.

Tables 1 and 2 show examples of fields that may be present in the customer care database 124, whether associated with the customer information records 202, billing account records 204, and/or the products and services records 206.

TABLE 1

General Customer Information

| Field | Comment |
| --- | --- |
| Customer Code | A unique identifier assigned to the customer. |
| First Name | |
| Last or Corporate Name | |
| Personal ID | An customer selected identifier. |
| Account Status | Status of the customer account |
| Fraud Level | Level of trust assigned to the customer |
| Fraud Flag | Set if the account is associated with fraudulent activity |
| Market Segment | A market identifier (e.g., Residential or Commercial). |
| Phone Number | |
| Fax Number | |
| Email Address | |
| Language | |
| Customer Class | An identifier of the relationship of the customer with the service provider (e.g., New or Long-Term). |
| Individual/ Company Flag | |

TABLE 1-continued

General Customer Information

| Field | Comment |
| --- | --- |
| Address Type | The type of address (e.g., a street address). |
| Street Name | |
| Unit Number | |
| City | |
| Town | |
| State | |
| Zip Code | |
| Country | |

TABLE 2

Customer Account Information

| Field | Comment |
| --- | --- |
| Account Name | |
| Account Since | |
| Tax Profile | |
| Account Type | e.g., Pre-paid or post-paid. |
| Account Status | Status of the account |
| Status Change Reason | Reason for changing the status of the account |
| Billing Account Code | A unique identifier assigned to the account |
| Invoice Language | e.g., English-American |
| Payment Method | e.g., Cash. |
| Credit Class | Level of credit of the account e.g., Gold, Silver or Bronze |
| Dunning Action | e.g., Required Suspension. |
| Dunning Status | e.g., Waiting for Processing, Locked |
| Dunning Date | The date the dunning action was issued. |
| Dunning Approved Flag | e.g., a Yes/No indicator of whether the dunning action is approved by the dunning operator. |

The Dunning Action, Dunning Status, Dunning Date, and Dunning Approved Flag provide dunning status fields for the customer account record. The dunning status fields synchronize the customer account record to the analysis performed in the dunning system 104. For example, the Dunning Action field may indicate that the dunning system 104 has recommended suspension or termination of a customer service or account. The dunning system 104 does not directly control the ultimate status of the account, however. Instead, the customer care system 102 operates as the master of the customer account data and thereby maintains centralized control of the account status, while integrating the dunning system 104 into the end-to-end architecture.

Figure 3:
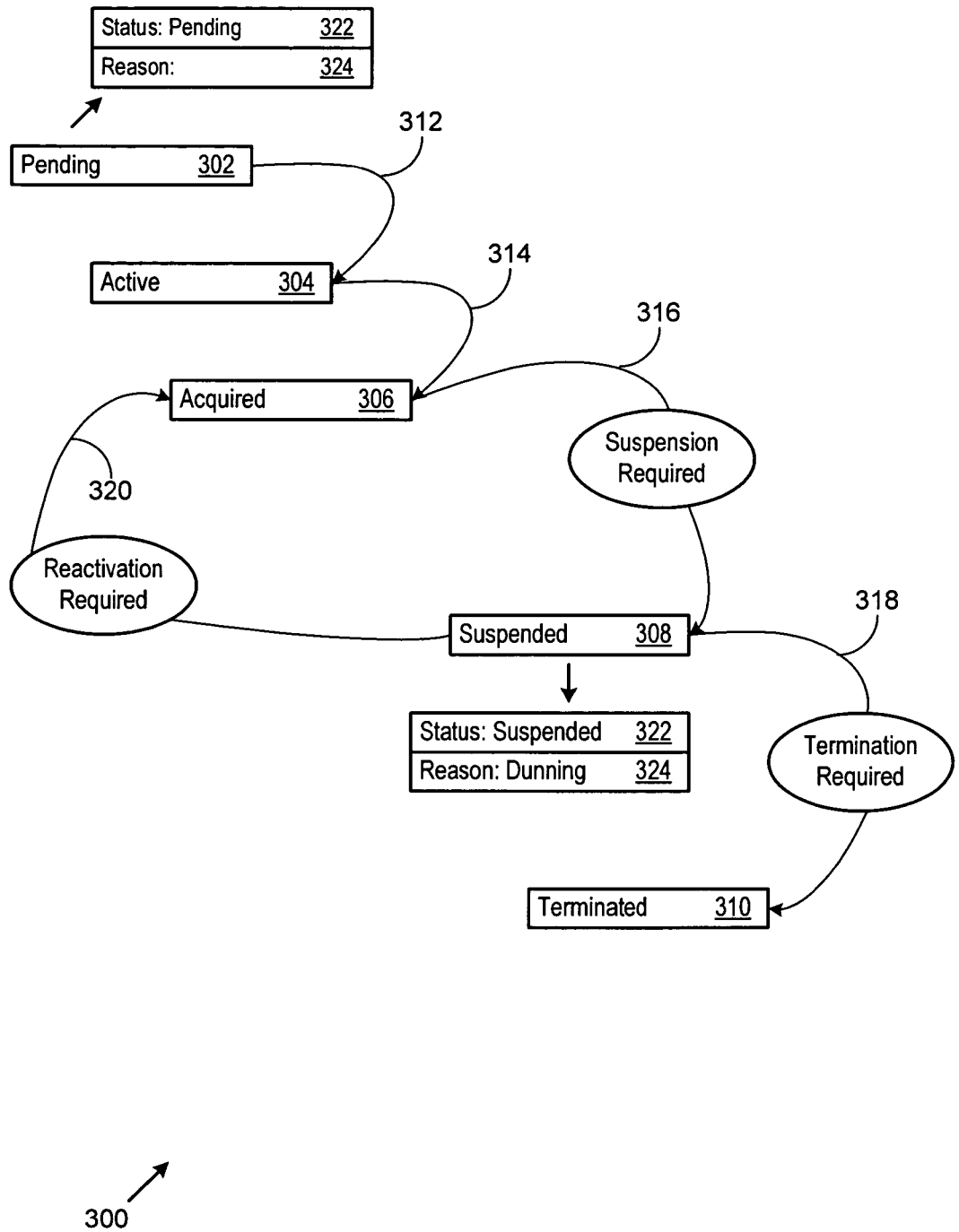
FIG. 3 illustrates a customer account state diagram.

FIG. 3 shows a customer account state diagram 300. The system 102 maintains the account state according to the account states defined in the state diagram 300 and the transition conditions between states. The account states include the 'Pending' account state 302, the 'Active' account state 304, and the 'Acquired' account state 306. The account states also include the 'Suspended' account state 308 and the 'Terminated' account state 310. The system 102 may correspondingly update the account state in a customer record status field 322 and may enter a status change reason in the status change reason field 324 in the customer record as well.

A 'Pending' account may be the initial status given to a new account, prior to validation against mandatory checks (e.g., verification of phone number, mailing address, email address, or other criteria) in the customer care system. A 'Pending' account may also be an account which is created and exists, but which is missing requisite information. An 'Active' account may be an account which has been validated against the mandatory checks and/or includes all of the requisite information. An 'Active' account may be associated with orders.

An 'Acquired' account may be an account which has been integrated with external systems and which has passed predefined validation rule checks. Additionally, an 'Acquired' account may be an account for which the first order has been submitted for provisioning. A 'Suspended' account may be a customer account on which all related services are suspended (but may be reactivated). A 'Terminated' account may be an account for which all of the associated services are terminated.

The system 102 implements predefined transitions between account states. A pending-to-active transition 312 represents one or more conditions which determine when a 'Pending' account becomes an 'Active' account. The transition 312 may include mandatory check conditions as noted above. An active-to-acquired account transition 314 similarly represents conditions which determine when an 'Active' account becomes 'Acquired'. The transition 314 may represent the integration of the new account into one or more of the systems which support the telecommunications service provider. The integration may include communicating establishment of the new account in the customer care system 102 to other systems such as the dunning system 104 and other support systems 106, or establishing a record of the new account in the other systems.

The acquired-to-suspended transition 316 may represent conditions which take the account from the 'Acquired' state 306 to the 'Suspended' state 308. The conditions may include receiving a suspension request from the customer, receiving (and processing) a 'Suspension' action request from the dunning system 104, or other request or condition. As part of implementing the transition to a 'Suspended' state, the system 102 may ensure that a status change reason field is populated appropriately. For example, the system 102 may populate the status change reason field 324 in the customer account with 'Customer Requests Suspension' or 'Dunning Suspension' or another status.

In addition, the state diagram 300 shows a suspended-to-acquired transition 320. The transition 320 may represent conditions which return an account from the 'Suspended' state to the 'Acquired' state. Such conditions include receiving a valid customer request, receiving payment of invoice due, receipt (and processing) of a dunning 'Reactivation' request, or other conditions.

The suspended-to-terminated transition 318 may represent one or more conditions which determine when a 'Suspended' account should become a 'Terminated' account. As with the acquired-to-suspended transition, the conditions for termination may include a valid customer request, a dunning 'Termination' action request, or other termination conditions. Accounts generally do not become reactivated once terminated, although transition conditions may also be established for returning an account to suspended, pending, active, or acquired status.

As part of implementing the transition to a 'Terminated' state, the system 102 may ensure that a status change reason field is populated appropriately. For example, the system 102 may populate the status change reason field 324 in the customer account with 'Customer Requests Termination' or 'Dunning Termination' or another status.

As will be described in more detail below, the system 102 provides centralized control over customer account status according to, and taking into consideration, information received from the dunning system 104. In addition, the system 102 may respond to dunning action requests for account termination, suspension, reactivation, or other action requests. In one implementation, the customer care system 102 automatically suspends, terminates, and reactivates customer accounts in response to dunning action requests. Alternatively or additionally, an authorized dunning operator interacts with a user interface which the customer care system 102 generates. The user interface includes a Suspend button, a Resume button, and/or a Disconnect (i.e., Terminate) button. In response to a button activation by the dunning operator, the customer care system 102 initiates execution of workflows to appropriately change the status of the customer account.

As noted above, the memory 120 includes the workflow definitions 134. In general, the workflow definitions 134 may be implemented with a workflow language such as the XML Process Definition Language (XPDL), the Business Process Execution Language for Web Services (BPELWS), or other languages. The workflows may be defined and implemented using the workflow toolkits provided with the underlying customer care system application, such as the Siebel™ workflow definition toolkit. The workflow definitions 134 are account synchronization and control workflows which the customer care system 102 employs to synchronize customer account status between the dunning system 104 and the customer care system 102, while retaining centralized control over the customer accounts at the customer care system 102.

Figure 4:
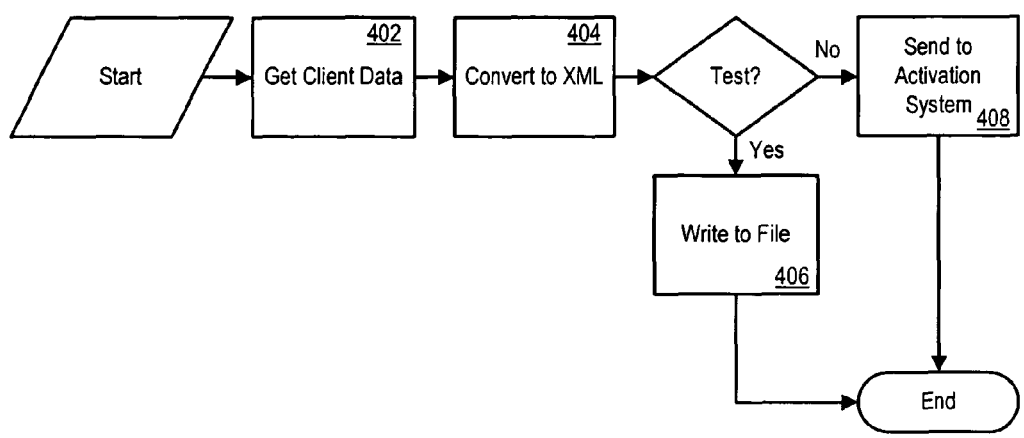
FIG. 4 shows an account modification workflow defined in the memory of the customer care system shown in FIG. 1.

FIG. 4 shows one of the workflow definitions 134: an account modification workflow 400. The account modification workflow 400 implements the steps taken to propagate changes made to a customer account in the customer care system 102 to the processing systems connected to the customer care system 102 (e.g., the billing system, provisioning system, or dunning system 104). As examples, customer care system 102 may initiate execution of the account modification workflow 400 to propagate updated general billing account information, billing account profile information, billing account address information, billing account personal data, dunning status, or to propagate other changes of the customer account.

The account modification workflow 400 first obtains the client data to be updated (Act 402). For example, the workflow 400 may execute a database query to obtain the customer account structure and data. The workflow 400 may then convert the client data to XML (Act 404). To convert the client data to XML, the workflow 400 may add predefined XML start and end tags around elements in the client data.

In some situations, the customer care system 102 may test its own functionality. When testing, the customer care system 102 may write the XML file to a data file (Act 406). An operator may then examine the data file as part of a troubleshooting or functionality verification investigation.

In most cases, however, the customer care system 102 is not in test mode. Thus, instead of writing the XML file to a data file, the workflow 400 instead sends the XML file to an activation system (Act 408) using an HTTP protocol with an address specified by IP and port number, or other address identifiers. The activation system may be an independent processing system, a program in the customer care system 102, or another entity which propagates the modified customer data to selected downstream systems 104-106. The customer care system 102 itself updates the customer care database 124 with the modified customer data.

The status of a customer account may change for many reasons. For example, a dunning action request may cause the customer care system 102 to change the customer account status (e.g., to 'Suspended'). In such cases, the customer care system 102 resets the dunning status of the customer account to clear any pending dunning actions, dunning action request, and/or other dunning status fields. To clear the dunning status fields, the customer care system 102 may initiate execution of a dunning cleaning workflow.

Figure 5:
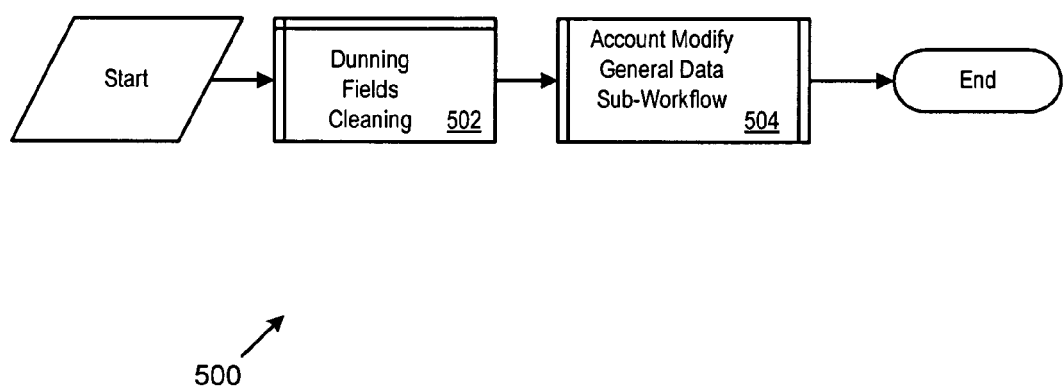
FIG. 5 shows a dunning cleaning workflow defined in the memory of the customer care system shown in FIG. 1.

FIG. 5 shows an example of a dunning cleaning workflow 500. The workflow executes a database operation to clear the dunning action, dunning status, dunning date, dunning approval flag, and/or any other dunning data fields in the customer billing record (Act 502). Once the database fields are cleared, the workflow initiates execution of the account modification workflow 400 (Act 504). The workflow 500 thereby propagates the cleaned dunning information for the customer account to any selected downstream systems.

As noted above, a dunning operator may determine when to accept and process dunning action requests received from the dunning system 104. For example, the dunning operator may periodically review accounts with active dunning statuses (e.g., a 'Waiting for Processing' status). To do so, the dunning operator may initiate a customer care database search for customer accounts with pending dunning action requests. The customer care system 102 may then present the matching accounts to the dunning operator in a graphical user interface for further processing.

The dunning operator may review a dunning action request that the customer account status should be changed to 'Suspended' or 'Terminated'. The dunning operator may approve or reject any such dunning action request. Alternatively, the dunning operator may modify the dunning status of the customer account. For example, the dunning operator may change the dunning status from 'Waiting for Processing' to 'Locked'.

When a customer account dunning status is 'Locked', the customer care system 102 will not change the account status in response to dunning action requests. The lock may persist for a predetermined time period (e.g., one week, one month, or one year), or may persist until the dunning operator removes the Locked status. The customer care system 102 will inform downstream systems of the 'Locked' status using a dunning check workflow.

Figure 6:
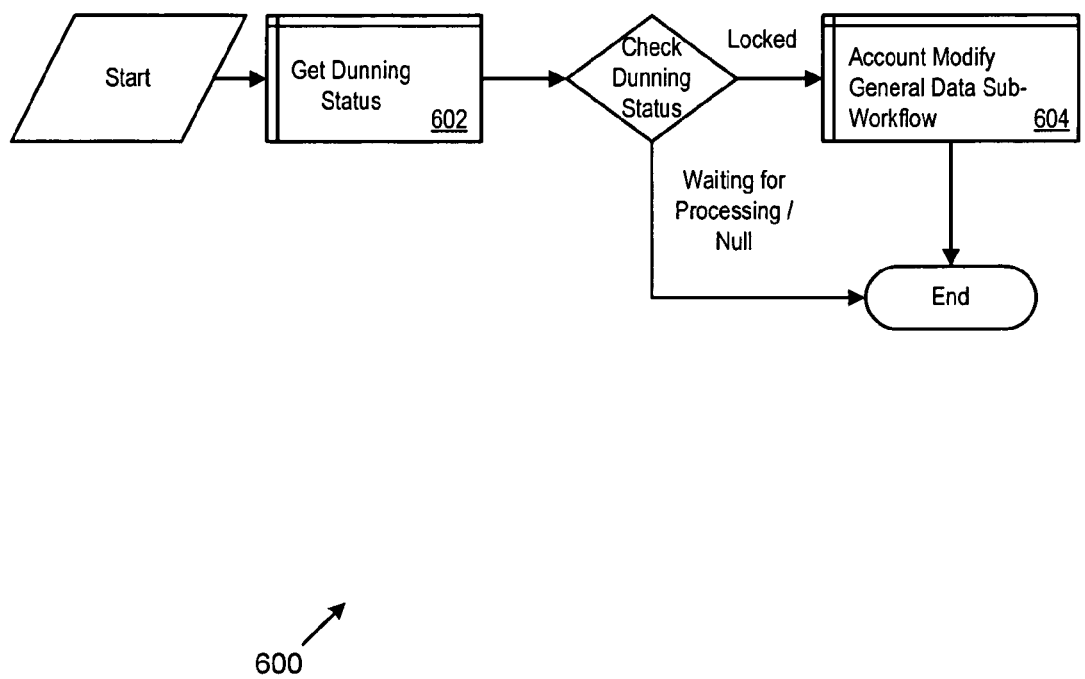
FIG. 6 shows a dunning check workflow defined in the memory of the customer care system shown in FIG. 1.

FIG. 6 shows an example of a dunning check workflow 600. The workflow 600 starts by obtaining the dunning status of the customer billing account (Act 602) from the account status field 208. The workflow 600 then checks the dunning status to determine if the dunning status is 'Locked'. If the dunning status is 'Locked', then the workflow 600 initiates execution of the account modification workflow 400 (Act 604). The account modification workflow 400 propagates the 'Locked' dunning status to any desired downstream processing systems, including the dunning system 104. The customer care system 102 and the dunning system 104 thereby remain synchronized with regard to customer dunning status, while account control is centralized in the customer care system 102.

If the customer account is not 'Locked', the workflow 600 does not update downstream systems. In that case, the workflow 600 ends without initiating execution of the account modification sub-workflow 400. Thus, the customer care system 102 may employ the dunning status change workflow 600 to communicate dunning status changes which occur internally in the customer care system 102 to the external systems 104 and 106.

The customer care system 102 may automatically suspend or resume a customer account in response to dunning action requests, customer requests, or for other reasons. For example, the dunning operator may accept a dunning suspension request and activate a user interface element for suspending a customer account. In response, the customer care system 102 may initiate execution of a suspend/resume workflow.

Figure 7:
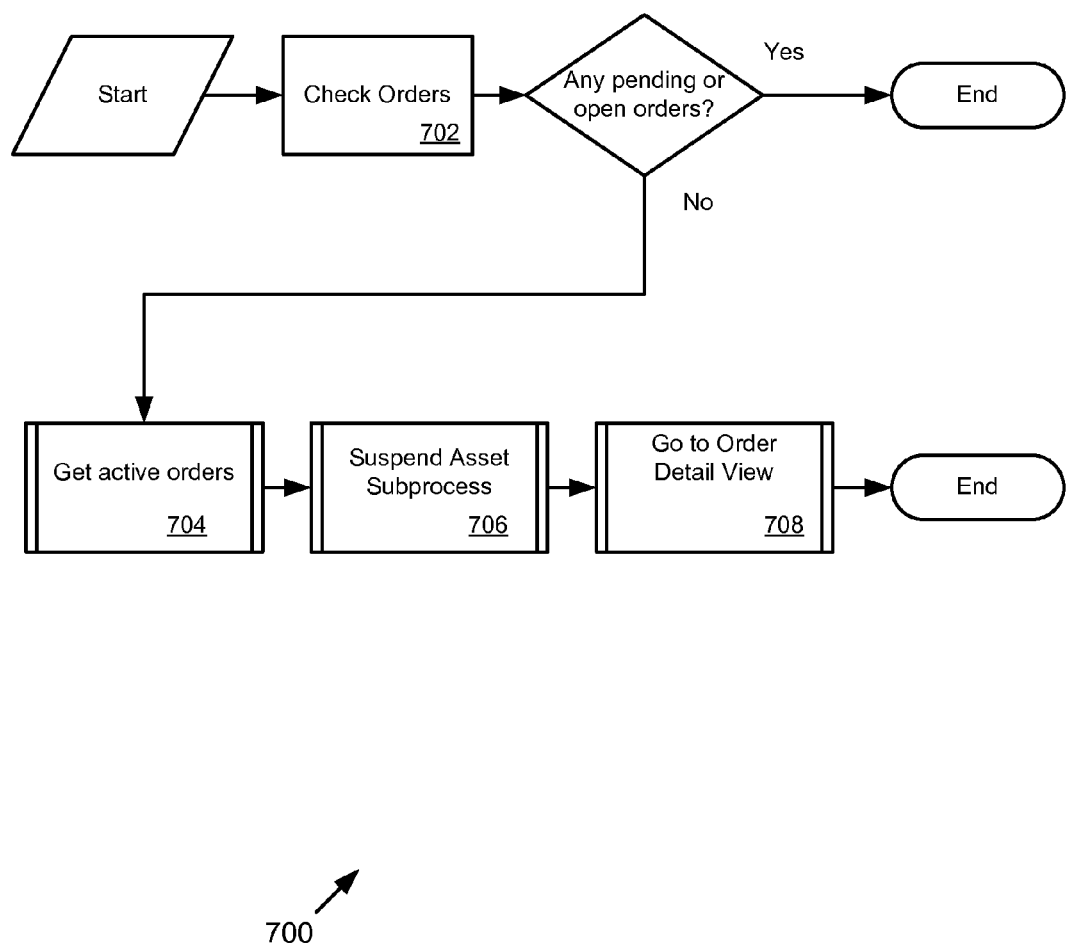
FIG. 7 shows an account suspension/resume workflow defined in the memory of the customer care system shown in FIG. 1.

FIG. 7 shows an example of a suspend/resume workflow 700. The workflow 700 creates a suspension or resume order in the customer care system 102. The workflow 700 first determines whether there are any pending or open orders for products and/or services on the customer account (Act 702). For example, a customer may have submitted an order request for internet service, leading to an active order in the system to provision the internet service. The customer account system 102 waits to suspend/resume the customer account until all such open orders have been processed. Thus, if there are open orders, the workflow 700 ends.

Otherwise, the workflow 700 initiates an order creation sub-workflow to create an empty order which will be used to suspend or resume a customer account (Act 704). Once the empty order is created, the workflow 700 initiates a suspend/resume asset sub-workflow to populate the newly created order with each product and service (i.e., line item) to which the customer subscribes (Act 706).

The workflow 700 then initiates a view workflow which generates a display in a graphical user interface which shows the customer care operator the populated suspend/resume order (Act 708). The operator may then check the order for problems before the order is processed. Once the suspend/resume order is complete, the customer care system 102 may automatically process the new order to suspend or resume each line item. In doing so, the customer care system 102 may communicate the suspend/resume order to the provisioning system to suspend/reactivate each customer line item of the selected asset.

Figure 8:
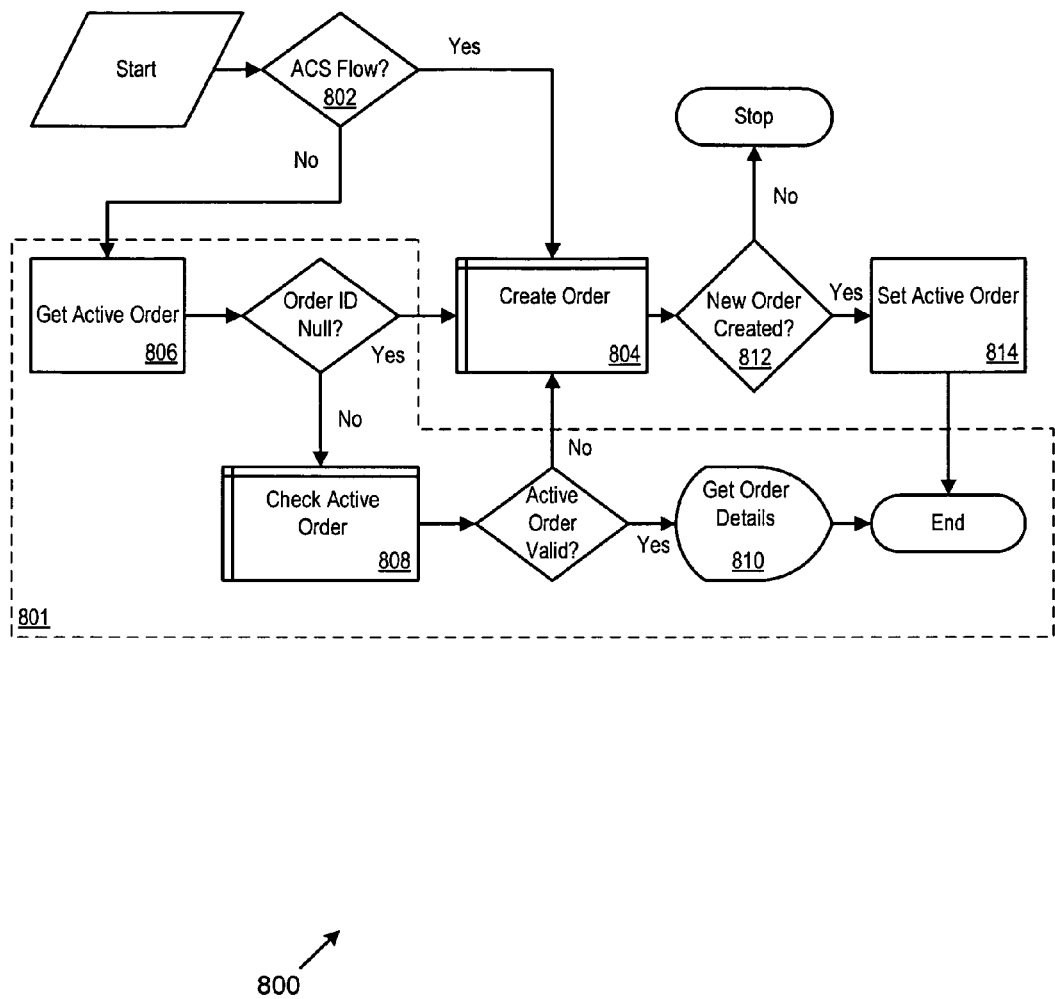
FIG. 8 shows an order creation workflow defined in the memory of the customer care system shown in FIG. 1.

FIG. 8 illustrates an order creation sub-workflow 800 which may be called from the suspend/resume workflow 700. The workflow 800 determines if it should bypass default order creation steps 801 (Act 802) which may be provided in default installations of the customer care object manager 130 and data manager 132. If a flag is set to True, the workflow 800 bypasses the default order creation steps 801 and immediately executes a customer care system operation to create a new order (Act 804). The workflow then checks to ensure that the order was successfully created (Act 812). If not, an error condition has occurred, and the workflow 800 terminates. Otherwise, the workflow 800 sets the newly created order as the active order (Act 814).

if the default order creation steps 801 are not bypassed, the workflow 800 retrieves any active order against the customer account (Act 806). If the result is Null (i.e., no order exists), the workflow proceeds to create a new order (Act 804). Otherwise, the workflow 800 initiates a second check of the active order by querying the customer care system 102 to search for the order previously retrieved (Act 808). If the order previously retrieved does not exist, the workflow 800 creates a new order (Act 804). However if the order previously retrieved does exist, the workflow displays the data in the order (Act 810).

Figure 9:
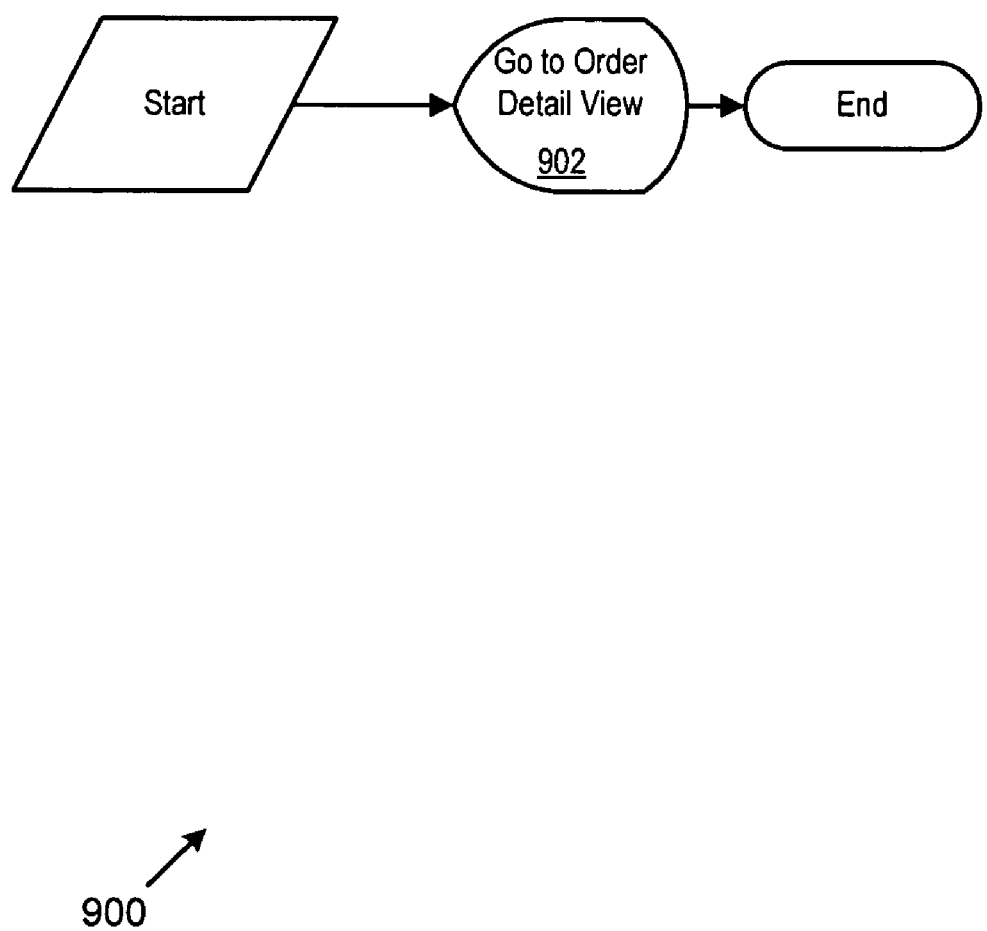
FIG. 9 shows an order view workflow defined in the memory of the customer care system shown in FIG. 1.

As noted above in the discussion of FIG. 7, the workflow 700 initiates execution of a view workflow to display the fully populated suspend/resume order. FIG. 9 shows an order detail view workflow 900. The order detail workflow 900 instructs the customer care system 102 to display a window which includes detailed order information (Act 902). The detailed order information may include each line item belonging to a customer asset, a pending operation such as 'Suspend' or 'Resume', customer name, address, contact information, and any other information associated with the suspend or resume order.

The workflow 700 also initiates execution of suspend/resume asset sub-workflow which automatically creates a suspension order or a resume order for the customer asset and every line item associated with a customer asset. Each product and service which a customer subscribes to is a line item which makes up part of the overall customer asset. Thus, the workflow 700 may suspend or resume multiple line items per asset in one execution of the workflow 700.

Figure 10:
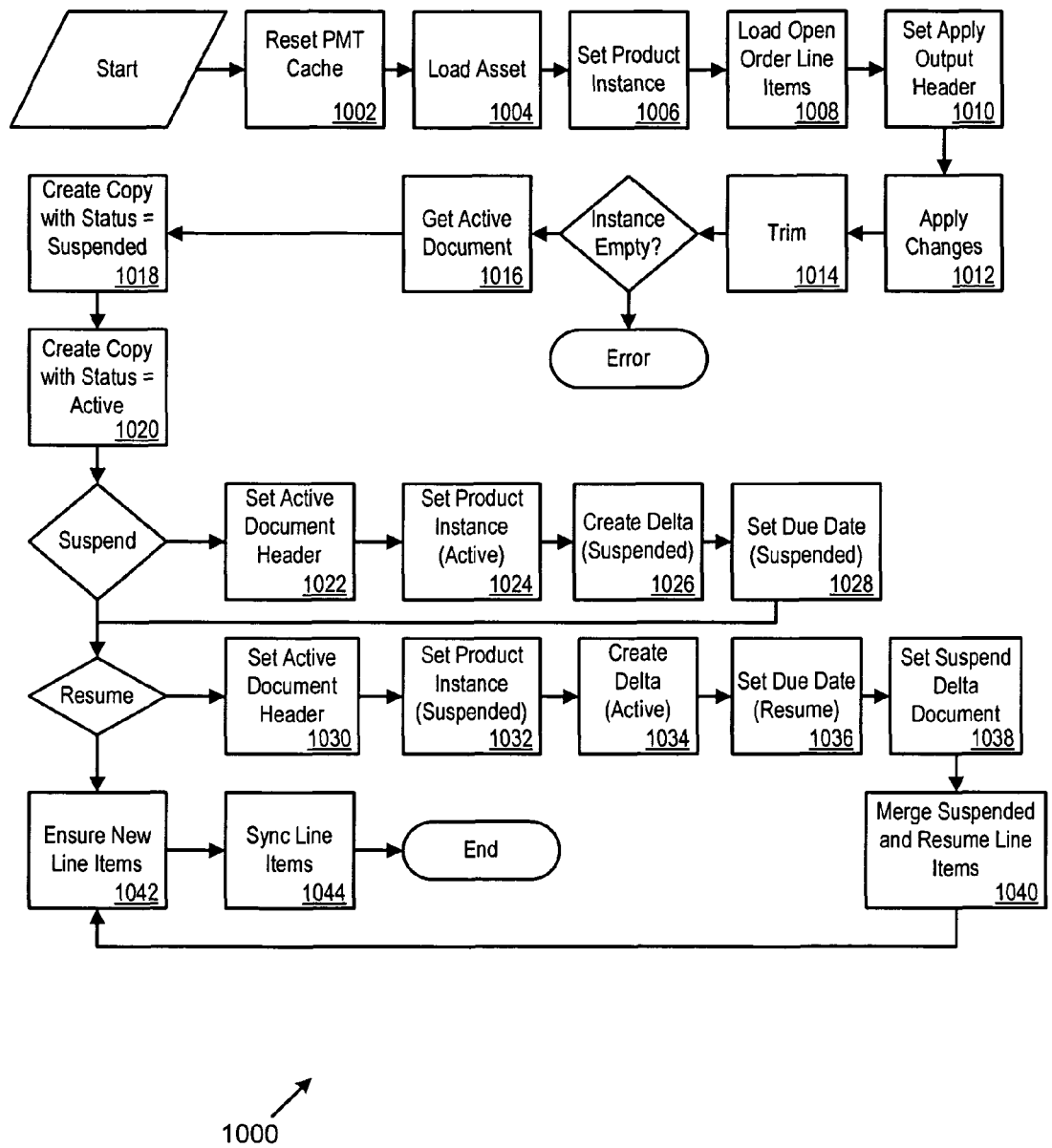
FIG. 10 shows a suspend/resume asset workflow defined in the memory of the customer care system shown in FIG. 1.

FIG. 10 shows an example of a suspend/resume asset subworkflow 1000 which populates a newly created suspend/resume order with each line item to be suspended or re-activated. The workflow 1000 first resets the cache (e.g., the cache of the Siebel PMT service) (Act 1002) to clear out any possible data remnants from previously processed workflows or orders. The workflow 1000 proceeds by loading the data for the customer asset (Act 1004), including asset identifier, customer name, customer identifier, and any other data associated with a customer asset by the customer care system 102. Each line item in the asset will be suspended or resumed. In addition, the workflow 1000 sets the product instance (Act 1006) which loads the asset into cache for efficient processing.

The workflow 1000 also loads any open order line items (Act 1008), loads any header information associated with the current asset (Act 1010), and adds line items from the open orders to the current asset (Act 1012). This captures the future state of the asset as well as the pending state of the asset. However, as noted above, in certain implementations the workflow 700 waits for all open orders to complete. In that case, there will be no open order line items.

The workflow 1000 also executes a trim check of the asset (Act 1014). The trim check determines whether the asset has any line items (i.e., whether the customer has any products or services). If the asset is empty, the workflow 1000 ends. In other words, if the customer asset has no products or services, then the workflow 1000 ends since there are no line items to suspend or resume.

Otherwise, the workflow 1000 obtains the active document (Act 1016). The workflow 1000 thereby loads the earlier created suspend/resume order (workflow 700, Act 704) in which the workflow 1000 will populate the line items. The workflow 1000 creates a suspend copy of the asset (Act 1018) and a re-activate (resume) copy of the asset (Act 1020). Creating both copies supports both suspending and re-activating different line items in a single execution of the workflow 1000, as will be described below. The suspend copy has the status or action code of each line item set to Suspended, while the active copy has the status or action code of each line item set to Active. The action code represents the action to be taken by the provisioning system, billing system and/or other support system. In other words, the suspend copy is used to suspend line items, while the active copy is used when the customer care system 102 will resume line items.

If each line item should be suspended, the workflow 1000 proceeds as follows. The workflow 1000 sets the active document header (Act 1022) which copies the header information from the asset into the suspension order. The workflow 1000 also copies each currently active line item from the asset into the suspension order (Act 1024). The workflow 1000 then creates and activates the suspension document with the active asset line items copied into the order (Act 1026) and sets the due date for suspension of the line items (Act 1028). The suspension order is thereby communicated to downstream systems for processing, such as the billing system and provisioning system.

Similar processing occurs for a resume order. The workflow 1000 sets the active document header (Act 1030). The workflow 1000 thereby copies the header information from the asset into the activate order. The workflow 1000 also copies each currently suspended line item from the asset into the activate order (Act 1032). The workflow 1000 then creates and activates the active document with the suspended asset line items copied into the order (Act 1034), and also sets the due date for carrying through the resumption of each line item (Act 1036).

In some implementations, the workflow 1000 supports suspension of one or more line items simultaneously with re-activation of one or more line items, in the same order. In that case, the workflow 1000 may also set the suspended delta document (Act 1038), then merge the line items for suspension and the line items for re-activation (Act 1040). In other words, at Act 1038, the workflow 1000 retrieves a list of line items to be suspended (e.g., retrieves the suspend copy of the order). The list of line items to be suspended is merged into a list of line items to be re-activated (e.g., merged into the active copy of the order) in Act 1040 to create one list with both suspensions and re-activations.

Alternatively, the workflow 1000 may process only suspensions or re-activations in one order. When the workflow 1000 processes only suspensions or re-activations in one order, the Acts 1038 and 1040 may be omitted.

The workflow 1000 continues by generating unique identifiers for each line item in the activate document or suspension document (Act 1042). The activate document or suspension document, currently held in memory, is then stored in the customer care database 124 (Act 1044). The workflow 1000 then ends.

Figure 11:
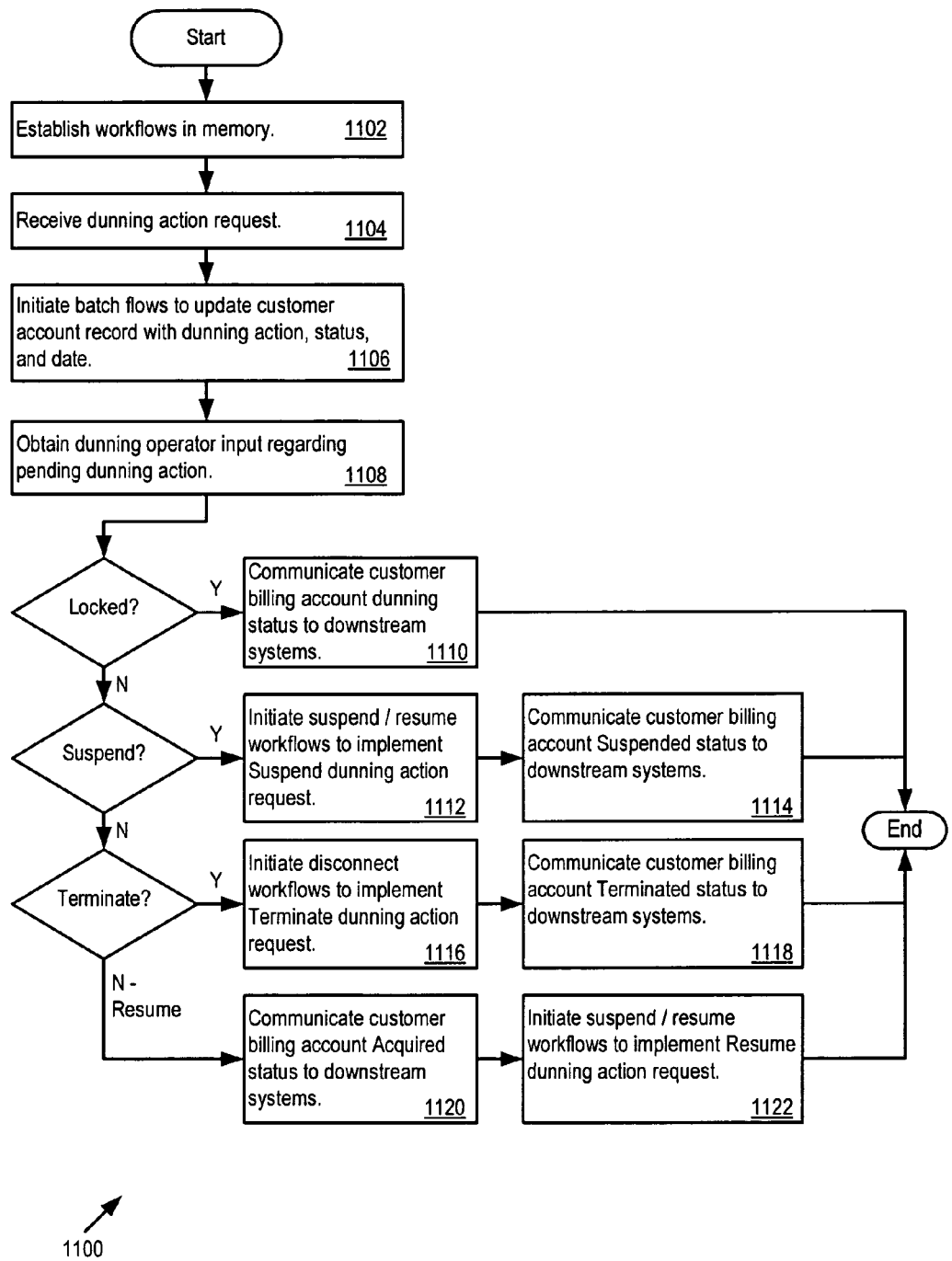
FIG. 11 shows the acts that may be taken by the customer care system to integrate a dunning system into an end-to-end architecture.

FIG. 11 shows the acts 1100 that may be taken by the customer care system 102 to maintain centralized control over the customer billing account, while integrating the dunning billing system 104 and support systems 106 into the telecommunications service provider architecture. The customer care system 102 is configured with workflow definitions 134 (Act 1102). During operation, the customer care system 102 receives dunning action requests from the dunning system 104 (Act 1104) in a batch file. The dunning action requests may be 'Suspend' requests, 'Terminate' requests, 'Resume' requests, or other types of requests with respect to a product, server, or account associated with a customer.

When the customer care system 1000 receives the dunning action requests, the customer care system 1000 initiates a batch processing script to update the customer account record with dunning action (e.g., 'Suspend'), dunning status (e.g., 'Waiting for Processing'), and dunning date (Act 1106). The customer care system 102 thereby synchronizes the customer record in the customer care system 102 with the dunning analysis and recommended dunning action determined in the dunning system 104.

The customer care system 102 may automatically implement the dunning action requests. Alternatively, the customer care system 102 may first obtain dunning operator input regarding whether or not to accept the pending dunning action on the customer account (Act 1108). If a 'Lock' is applied to the customer account, then the customer care system 102 communicates the customer billing account dunning status to downstream systems (Act 1110) such as the dunning system 104 or other support systems 106. If a 'Lock' is not applied to the customer account, then the customer care system 102 may initiate suspend/terminate/resume workflows which implement the dunning action request. For example, the customer care system 102 may initiate execution of the workflows 700, 800, 900, and 1000 to suspend, terminate, or resume a customer account.

In particular, when the dunning action request is to Suspend the customer account, the customer care system 102 initiates execution of a suspend workflow to implement the Suspend action request (Act 1112). The customer care system 102 also communicates the resulting Suspended status to one or more downstream systems (Act 1114). When the dunning action request is to Terminate the customer account, the customer care system 102 initiates execution of a terminate workflow to implement the Terminate action request (Act 1116). The customer care system 102 also communicates the resulting Terminated status to one or more downstream systems (Act 1118). A Resume request causes the customer care system 102 to communicate an Acquired status for the customer account to downstream systems (Act 1120) and to initiate a resume workflow to implement the Resume request (Act 1122). The customer care system 102 thereby maintains centralized control over the customer account, while integrating the dunning system 104 and support systems 106 into the end-to-end architecture.

Figure 12:
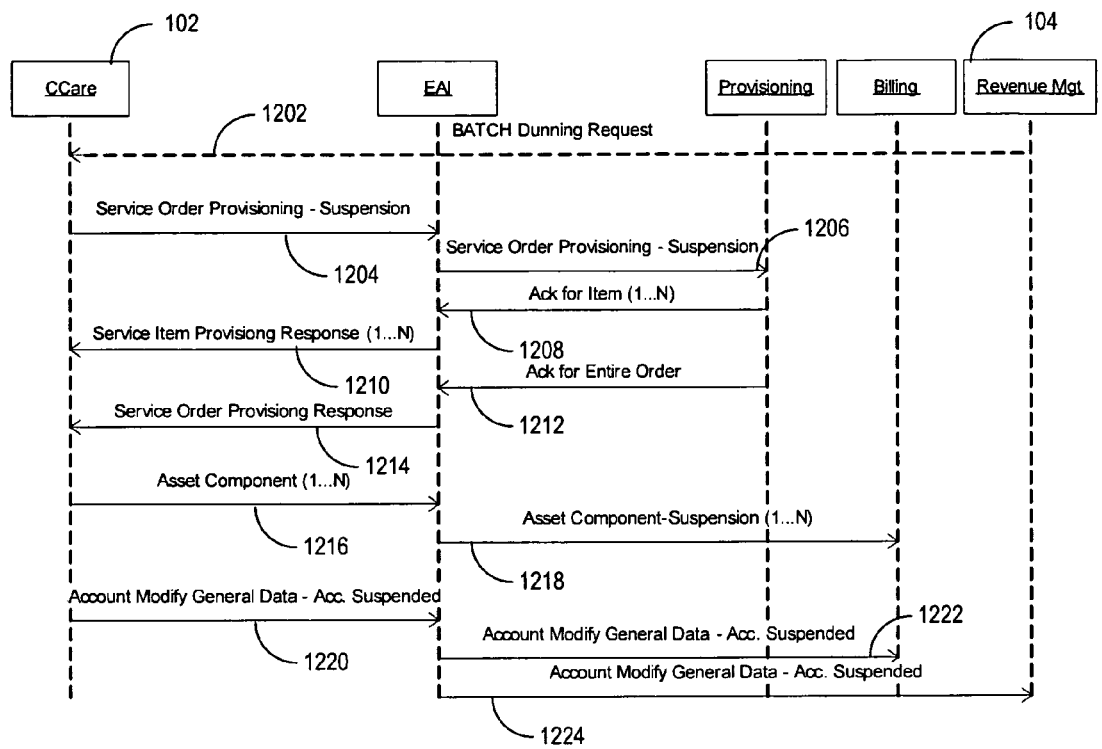
FIG. 12 shows an account suspension message flow diagram of messages passed between the customer care system, the dunning system, and other support systems.

FIG. 12 shows an account suspension message flow diagram 1200. Initially, the dunning system 104 sends the dunning action request batch file 148, including suspension action requests, to the customer care system 102 (Flow 1202). The customer care system 102 responds by executing the suspension workflows noted above and communicating the suspensions for each line item to the provisioning system (Flow 1204-1206). The provisioning system terminates each line item (e.g., disconnects services and products, such as Internet service, cellular phone service, or other services) and sends back an acknowledgement to the customer care system 102 for each line item (Flow 1208-1210). The provisioning system also sends back an acknowledgement for suspension of the customer asset as a whole (Flow 1212-1214).

Once the provisioning system has acknowledged suspension of each line item and has acknowledged processing the entire order, the customer care system 102 communicates with the billing system. In particular, the customer care system informs the billing system that each asset line item has been suspended (Flow 1216-1218). In addition, the customer care system 102 further informs the billing system that the customer account as a whole is suspended (Flow 1220-1222).

The dunning system 104 also receives a message that the customer account is suspended (Flow 1220-1224). As shown in FIG. 12, the messages may pass through or may originate from the enterprise application integration (EAI) layer. The EAI layer may be implemented as a messaging interface (e.g., a publish/subscribe messaging interface, a separate processing system, program, or other entity) which prepares messages in a standard format (e.g., XML format), accepts message source and destination information, and which forwards messages to recipients.

Figure 13:
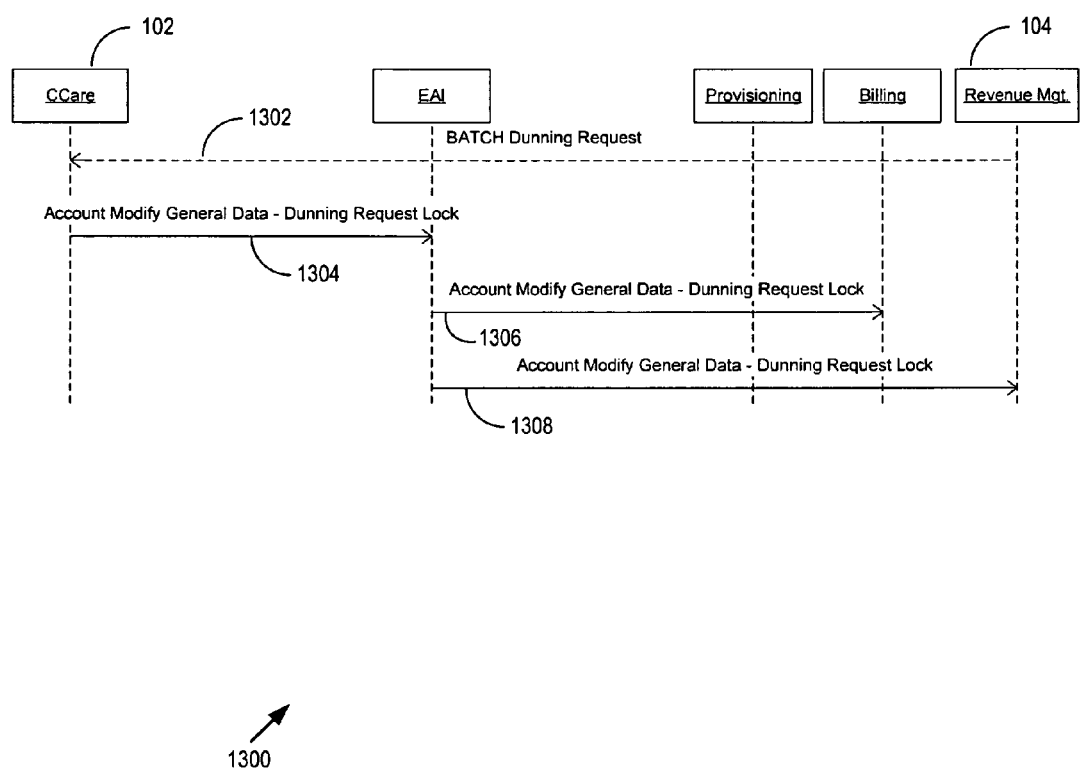
FIG. 13 shows a dunning request lock message flow diagram of messages passed between the customer care system, the dunning system, and other support systems.

FIG. 13 shows a dunning request lock message flow diagram 1300. As noted above, when the dunning operator applies a 'Lock' to a customer account, the customer care system 102 does not execute requested dunning actions against the account. The customer care system 102 does, however, communicate the Locked status to downstream systems. As shown in FIG. 13, the dunning system 104 sends the dunning action request batch file 148, including suspension actions, to the customer care system 102 (Flow 1302). In processing the action requests, the account status changes to Locked, for example, as set by the dunning operator. The customer care system 102 communicates the account status change to the EAI layer (Flow 1304). The EAI layer in turn communicates the Locked status to the billing system (Flow 1306) and the dunning system 104 (Flow 1308). The billing system and the dunning system therefore know that the customer account is Locked and that the dunning actions will not be executed against the customer account.

Figure 14:
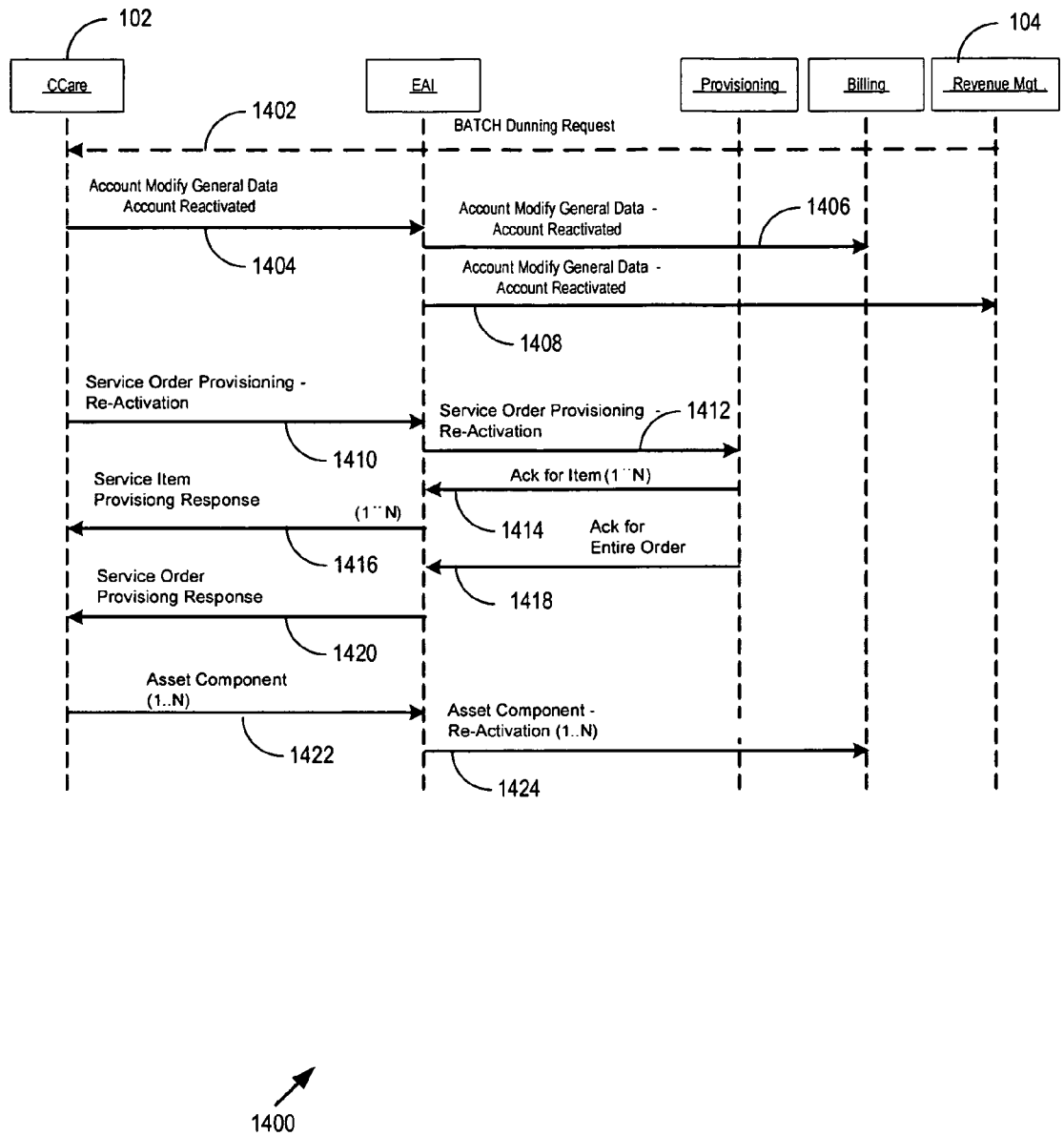
FIG. 14 shows an account reactivation message flow diagram of messages passed between the customer care system, the dunning system, and other support systems.

FIG. 14 shows an account reactivation message flow diagram 1400. Initially, the dunning system 104 sends the dunning action request batch file 148, including resume actions, to the customer care system 102 (Flow 1402). The customer care system 102 responds by executing the activate workflows described above. The customer care system 102 may first reactivate the customer account as a whole so that the billing system may re-associate assets to an active account (Flow 1404-1408). The customer care system 102 may then communicate the activations for each line item to the provisioning system (Flow 1410-1412). The provisioning system re-activates each line item and sends back an acknowledgement to the customer care system 102 for each line item (Flow 1414-1416) as well as for the activation order as a whole (Act 1418-1420). In addition, the customer care system 102 informs the billing system that each asset line item has been re-activated (Flow 1422-1424).

Accordingly, the customer care system 102 is integrated under one architecture with the dunning system 104. The customer care operator has more complete knowledge of the complete customer account picture, and may be additionally informative and able to assist a customer who calls with questions. Furthermore, the dunning system 104 no longer operates in isolation, but shares the appropriate dunning action requests with the customer care system. The dunning operator in the customer care system may then exercise control over the processing of the dunning action requests, allowing the customer care system to retain centralized control over the customer account.

The batch process to receive dunning action requests was designed as an efficient, low complexity, and reusable technical solution which allows expansion of the interface to new CRM and Dunning systems as needed. The implementation described above provides a scripting engine that is both portable and operating system/database independent. The implementation overcomes the technical challenges associated with identifying and implementing SQL procedures to load data from the dunning request files and may be used with only minor modifications on a wide range of database systems (e.g., both Unix/Oracle™ and Microsoft/MS SQL™ systems).

Also, once the dunning action data is received from the Dunning System, the implementation provides a solution to responsively updating the customer dunning status field in the customer account. In particular, the implementation provides a lock/unlock process that allows the customer management system 102 to maintain ownership and centralized control over processing the dunning action data. The lock/unlock process ensures that only the trained Dunning Operator, after reviewing the customer interaction history, may decide whether to pursue the requested dunning action.

This implementation also implements the suspension/reactivation process of customer services. To accomplish this, the implementation enhances business events to share suspend/resume information with both provisioning and billing systems. More specifically, the implementation provides an xml field 'Action Code' to identify the correct action to be performed (e.g., Suspend, Resume, or Terminate) by the downstream systems. In this way the suspend/resume workflows in the customer management system 102 extended existing messages with responsively updated 'Action Code' fields according to the dunning procedure followed for the selected customer.

Furthermore, for synchronizing the customer account status with the dunning and billing systems, the implementation provides a technical solution through the account modification workflow 400. In particular, the workflow 400 is enhanced to accomplish sharing a common framework which includes specific customer account fields, between other systems. This enhancement is achieved by adding to the customer account shared interface the specific dunning fields that support the synchronization between the customer care system and external systems. The fields include the dunning action field 208, the dunning status field 210 and the account status field 322. When requested by the dunning procedure the system may synchronize these fields with the downstream systems using the EAI or a batch interface.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method comprising:
storing a customer account record with a customer care database of a customer care system, the customer care system comprising a processor, a memory coupled to the processor, and the customer care database coupled to the processor;
defining workflows in the memory of the customer care system, the workflows comprising a suspend asset workflow, a resume asset workflow, and a dunning cleaning workflow;
receiving a dunning action request batch file from an external dunning system;
the customer care system storing the received dunning action request batch file in the memory;
the customer care system processing the dunning action request batch file and responsively updating a customer dunning status field in the customer account record;
when the dunning action request batch file includes a suspension request for a customer asset, initiating execution of the suspend asset workflow in the customer care system to create an asset suspension order, and communicating suspension of the customer asset to the external dunning system;
when the dunning action request batch file includes a re-activation request for a customer asset, initiating execution of the resume asset workflow in the customer care system to create an asset re-activation order, and communicating re-activation of the customer asset to the external dunning system;
synchronizing a local database of a mobile client with the customer care database of the customer care system; and
using the mobile client to perform a troubleshooting investigation of the customer care system.

2. The method of claim 1, wherein updating the customer dunning status field comprises setting the customer dunning status field to 'Waiting for Processing'.

3. The method of claim 2, further comprising communicating a suspension order for the customer asset to a telecommunication provisioning system.

4. The method of claim 1, further comprising: denying a requested dunning action via the mobile client.

5. The method of claim 1, wherein the customer care database comprising an account dunning action field, an account dunning status field, a status change reason field, and an interaction section.

6. The method of claim 1, wherein the dunning action request batch file comprises multiple dunning action requests.

7. The method of claim 6, wherein the receiving the dunning action request batch file comprises receiving new dunning action request batch files on a regular schedule.

8. The method of claim 6, wherein updating the customer dunning status field comprises:
receiving dunning input from a dunning operator accepting the dunning action request;
setting the customer dunning status field to 'Locked' in response to the dunning input; and
communicating the 'Locked' customer dunning status field to the external dunning system.

9. A system comprising:
a customer care system comprising:
a communication interface operable to communicate with an external dunning system;
memory coupled to the communication interface, the memory comprising:
a customer account record;
a dunning action request batch file received from the external dunning system;
a batch processing script operable to process the received dunning action request batch file and responsively update a customer dunning status field in the customer account record;
a suspend/resume workflow executed by the customer care system for suspending a customer asset or re-activating a customer asset in accordance with the received dunning action request batch file; and
an account modification workflow for communicating suspension of the customer asset to the external dunning system;
a processor coupled to the memory which executes the batch processing script, the suspend/resume workflow, and the account modification workflow;
a customer care database coupled to the processor;
a mobile client comprising a local database, wherein the mobile client for synchronizing the local database with the customer care database via the communication interface, wherein the mobile client for performing a troubleshooting investigation of the customer care system.

10. The system of claim 9, wherein the dunning action request batch file comprises: a dunning 'Suspension' action request, and wherein the batch processing script updates the customer dunning status field by responsively setting a Suspension requested flag.

11. The system of claim 10, wherein the processor receives a dunning operator input for applying a 'Lock' to the customer account record, and wherein the customer care system communicates the 'Lock' to the external dunning system.

12. The system of claim 9, wherein the dunning action request batch file comprises a dunning Termination action request, and wherein the processing script updates the customer dunning status field by responsively setting a Termination requested flag.

13. The system of claim 12, wherein the processor receives a dunning operator input for applying a 'Lock' to the customer account record, and wherein the customer care system communicates the 'Lock' to the external dunning system.

14. The system of claim 9, wherein the memory further comprises a dunning check workflow definition.

15. The system of claim 14, wherein the dunning check workflow definition reads the customer dunning status field, and when a 'Lock' is applied, responsively communicates the 'Lock' to the external dunning system.

16. A system comprising:
a dunning processing system comprising:
a dunning communication interface;
a memory comprising a dunning financial accounting system which periodically generates a dunning action request batch file; and a processor coupled to the memory which executes the accounting system and which communicates the dunning action request batch file through the dunning communication interface;

a customer care processing system comprising:
- a customer care communication interface coupled to the dunning communication interface;
- a memory comprising:
  - a dunning cleaning workflow;
  - a customer asset suspend/resume workflow;
  - an account modification workflow;
  - a customer account record comprising a customer dunning status field; and
  - a batch processing script for processing the received dunning action request batch file; and
- a processor coupled to the memory which executes the batch processing script and responsively updates the customer dunning status field, wherein the processor further executes the customer asset suspend/resume workflow in response to a Suspend or Activate status in the customer dunning status field and further executes the account modification workflow to communicate customer asset suspension or reactivation to the dunning processing system;
- a customer care database coupled to the processor;
- a mobile client comprising a local database, wherein the mobile client for synchronizing the local database with the customer care database via the customer care communication interface, wherein the mobile client for performing a troubleshooting investigation of the customer care processing system;
- wherein the dunning processing system is external to the customer care processing system.

17. The system of claim 16, wherein the memory further comprises a dunning check workflow which is operable to read the customer dunning status field, and when a 'Lock' is applied, responsively communicate the 'Lock' to the dunning system.

18. The system of claim 17, wherein the dunning action request batch file comprises a customer asset suspend action request or a customer asset terminate action request.

19. The system of claim 17, wherein the dunning action request batch file comprises a customer asset re-activation action request.

20. The system of claim 17, wherein the memory further comprises a dunning cleaning workflow definition operable to reset the customer dunning status field.

* * * * *